Patented Dec. 24, 1940

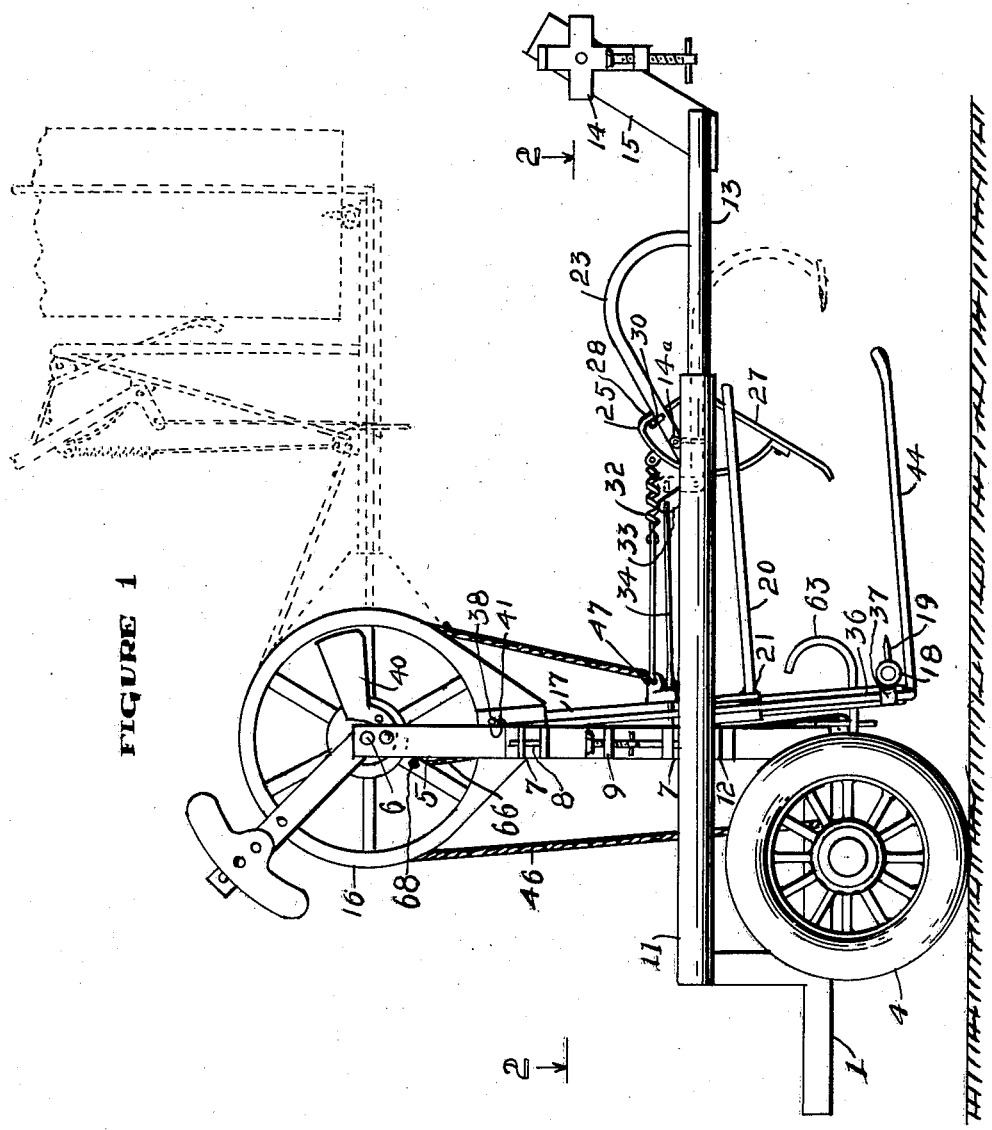

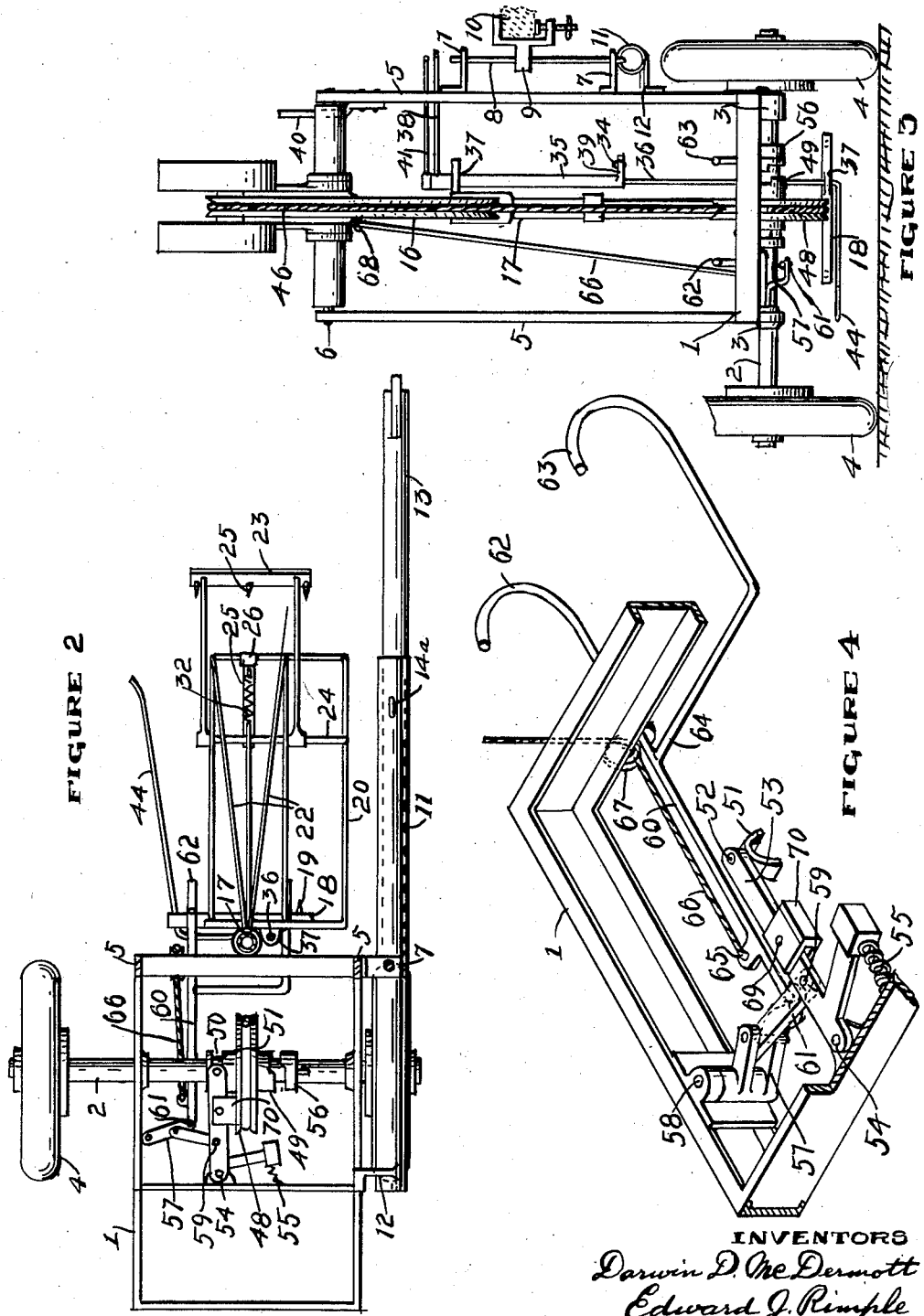

2,225,787

UNITED STATES PATENT OFFICE 2,225,787

TRUCK LOADER

Darwin D. McDermott, San Jose, and Edward J. Rimple, Santa Clara, Calif.

Application April 19, 1939, Serial No. 268,774

10 Claims. (Cl. 214—81)

The present invention relates particularly to a device for loading baled hay and similar bundles on to a truck or other vehicle.

One object of the present invention is to provide mechanical means operable to lift heavy loads such as baled hay, and deposit the same on a cooperating truck.

It is another object of the invention to provide a device of the character indicated that may be removably attached to a truck and operated by movement of the truck relative to the body of the device.

It is also an object of the invention to provide a device of the character indicated that is so constructed and arranged that it will automatically grasp and hold a load when moved into engagement therewith, and that will at the same time automatically render the lifting mechanism operable.

It is a further object of the invention to provide a device of the character indicated constructed and arranged to positively release and discharge the load thereon when elevated to the required height.

Finally, it is an object of the invention to provide a device of the character indicated that will be economical to manufacture, simple in form and construction, strong, durable, and highly efficient in its practical application.

In the drawings:

Figure 1 is a side elevation of a device embodying our invention.

Figure 2 is a plan view on line 2—2 of Figure 1.

Figure 3 is a rear elevation of the device, parts being broken away.

Figure 4 is a perspective view of a portion of the device showing the clutch operating mechanism.

Figure 5:
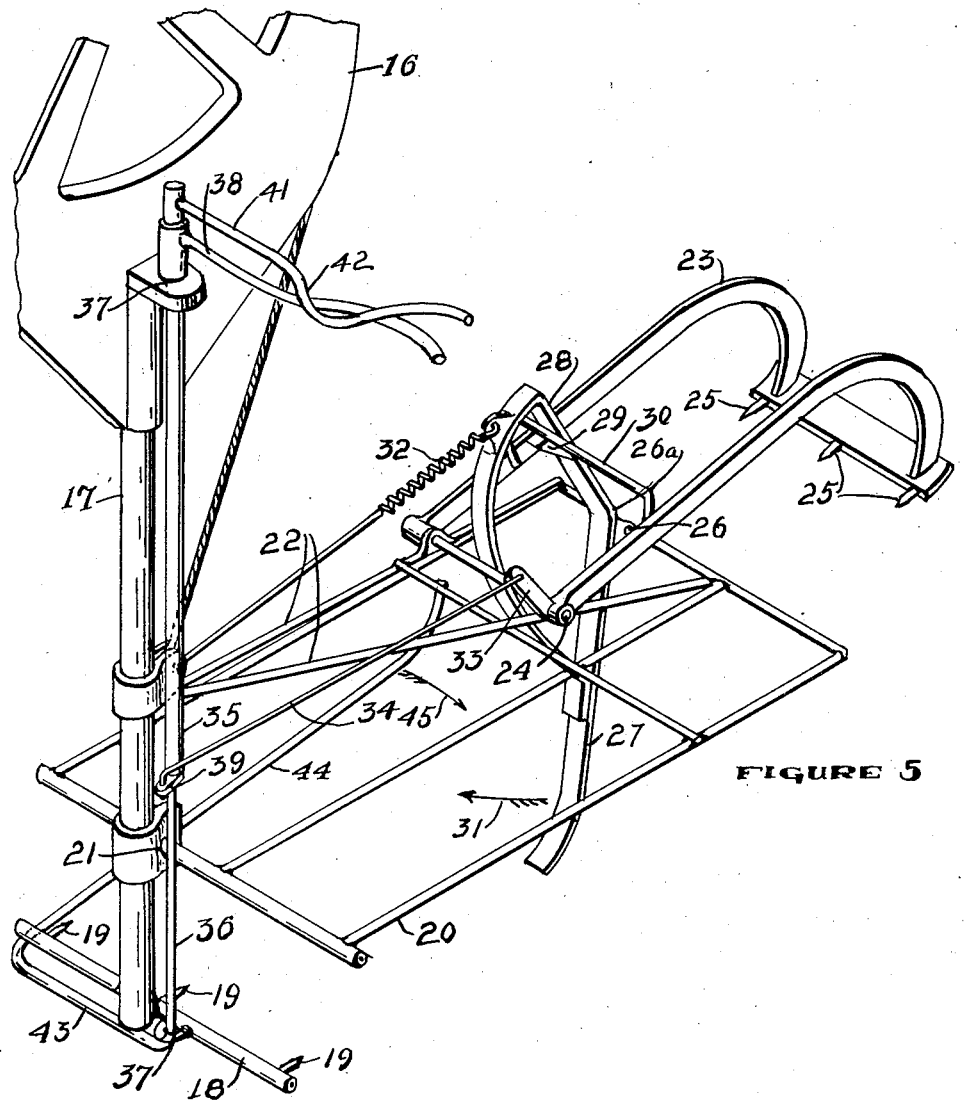
Figure 5 is a perspective illustration showing the bale holding portion of the lifting mechanism.

Referring now more particularly to the drawings, we show at 1 a horizontal frame mounted upon a shaft 2 through the medium of bearings 3 in which the shaft rotates. Upon the shaft 2 are mounted wheels 4, the shaft and wheels rotating as a unit when the device moves forwardly, suitable means, not shown, being inserted between the wheels and shaft to permit relative rotation when the device is moved backwardly.

Fixedly mounted upon the forward end of the frame 1 are spaced, parallel, upstanding supports 5—5 carrying a fixed horizontal shaft 6. On the outer side of one of the supports 5 are mounted vertically spaced brackets 7—7 carrying a vertical bar 8 on which is mounted an adjustable clamp 9. By means of the clamp 9 suitable connection may be made to the body 10 of a truck.

Since the frame 1 should have at least two points of connection to body 10 we mount a tubular member 11 on the frame 1 and support 5 as at 12, in parallel relation to the plane of frame 1. Slidably mounted in the forward end of the tube 11 is a bar 13 adjustably positioned lengthwise by means of a pin 14 passing through tube and bar. A clamp 14 is mounted on the forward end of the bar 13 as at 15 to engage the truck body and support the forward end of the device in proper relation thereto. The two connections to the truck body are such as to cause the device to travel in parallel relation to the truck and as a unit therewith.

The bale engaging and lifting means comprises a large pulley 16 rotatably mounted on shaft 6 and having a radially disposed hoisting beam 17 mounted thereon and normally extending downwardly to a point adjacent the ground. Upon the extremity of this beam is mounted a short crossbar 18 having forwardly directed bale-engaging pins 19 seated therein.

At 20 is shown a rectangular framework mounted on the beam 17 at 21 and braced by struts 22 extending from the beam 17 to the outer end of the frame. This frame 20 is disposed to overlie a bale when lying on the ground and when the pins 19 are moved into engagement with one end thereof.

To grasp and hold the bale for the lifting operation we provide a claw 23 pivotally mounted on a stub shaft 24 on struts 22 to swing about an axis parallel with cross-bar 18. This claw 23 has its outer end formed to carry pins as 25 movable into opposed relation to pins 19 but normally supported in an elevated position above the plane of the frame 20.

While the claw 23 is normally supported in an elevated position, automatically operated means is provided for permitting it to drop into a bale-engaging position. The supporting and releasing mechanism comprises a lever 25 pivotally mounted on the frame 20 at 26, its longer arm 27 extending below the frame and positioned to engage the top of a bale when the frame moves thereover. The short arm 28 extends upwardly and has a stop 29 disposed thereon to engage a cross-bar 30 on the claw 23 when the claw is in an elevated position, and arm 27 is extended downwardly.

When the arm 27 engages a bale it swing upwardly as indicated at 31 and slides over the top of the bale. This movement removes the stop from engagement with bar 30 and the claw is allowed to drop, this movement being controlled by a spring connection 32 to arm 28 and beam 17.

When the bale has been grasped as described and elevated as hereinafter set forth it is necessary, of course, to release the bale so that it may be discharged on to the truck. This releasing operation is accomplished by means of an arm 33 on claw 23 and connected by a link 34 to a lever 29 on sleeve 35 rotatably mounted on a vertical rod 36 journaled in bearings 37 on beam 17. The sleeve 35 terminates at one end at a point adjacent the periphery of the pulley 16 and parallels the beam 17, the last named end being fitted with a lever-arm 38 projecting outwardly therefrom as shown. This arm is so shaped and arranged that when the beam is in a substantially vertical position the arm is in engagement with the forward edge of frame 5 and the eccentric connection between the sleeve and link at 39 has elevated the claw 23 to a point where the stop 29 engages bar 30.

When the claw 23 is released and dropped as above described it operates to swing the arm 38 forwardly. Mounted on the frame or support 5 to lie in the path of travel of the arm 38 is a gauge member 40. The result of this construction is that when the beam 17 and parts carried thereby is swung upwardly by the rotation of pulley 16 the arm 38 will engage the gauge member 40, the continued movement of the beam causing the arrested member 38 to operate the parts 33, 34, 35, 39 to again elevate the claw 23 with respect to the frame 20.

When a bale has been grasped and elevated as described with the claw 23 disengaged therefrom, it is unloaded on to the truck in the following manner. One end of rod 36 is provided with a lever-arm 41 similar to arm 38 but formed to engage gauge 40 after arm 38 has engaged it and operated to release the claw 23 from the bale. To accomplish this the arm is provided with a depressed portion as at 42. The other end of rod 36 is bent laterally as at 43 to normally parallel cross-bar 18, and thence is projected angularly forwardly as at 44 so that it will lie along the side of a bale on frame 20 and pins 19. When the arm 41 is brought into contact with gauge 40 the continued upward movement of beam 17 causes the rod to rotate in bearings 37, thereby swinging the portion 44 in the direction indicated by arrow 45, this portion of the rod bearing against the bale and forcibly discharging it on to the truck. When the beam 17 drops back to its normal position the arm 41 will contact the support 5 and return the part 44 to its original position.

All of the operations so far described are dependent upon the movements of the beam 17, and the mechanism provided for operating and controlling the movements of this beam will now be described.

The beam 17 is raised and lowered through the medium of a cable 46 which is attached thereto at 47 and passes over the pulley 16 to a smaller pulley 48 on a sleeve 49 on shaft 2, the shaft normally rotating within the sleeve.

Engaging a groove 50 on sleeve 49 is a yoke 51 to which is pivoted at 52 a bell-crank 53 which is in turn pivoted on the frame 1 at 54. The end of the crank remote from pivot 52 bears against a spring 55 seated against frame 1, the spring operating to normally hold the sleeve 49 out of engagement with member 56 which is keyed to the shaft 2 and cooperates with the sleeve to form a clutch.

At 57 is shown a toggle pivotally mounted on frame 1 at 58 and on bell-crank 53 at 59. A push-rod 60 is pivotally connected to the toggle at 61 and passes forwardly of the frame to terminate in an upwardly turned bumper end as at 62. The bumper end 62 is duplicated at 63, the bumper 63 being formed integrally with rod 60 as at 64.

Connected to the push-rod 60 at 65 is a cable 66 which passes forwardly over a small pulley 67 on frame 1 and thence upwardly to the pulley 16 where it is attached as at 68.

Mounted on the bell-crank 53 at 69 is a brake shoe 70, this shoe being disposed to bear against the side of pulley 48.

When the machine is in operation it is moved forwardly by the truck until it approaches a bale. As the lever arm 27 moves over the bale the claw 23 is released and drops into position. The further movement of the machine brings the bumpers 62—63 into engagement with the bale and the bale is seated on pins 19. The engagement with the bumpers causes the push-rod to operate the toggle 57 and thereby engage the clutch 49—56 and disengaging pulley 67 from shoe 70. The rotation of the pulley 67 with shaft 2 operates to swing the beam 17 upwardly until the bale is released and discharged as described. When these operations have been accomplished the continued rotation of pulley 16 operates to pull on cable 66 and reverse the position of the toggle, thereby releasing the clutch 49—56 and permitting the beam 17 and the parts carried thereby to fall back to their original position. The descent of the beam 17 is rendered smooth and without jar by means of the shoe 70 contacting pulley 48.

Although a certain specific embodiment of the invention has been herein illustrated and described, it will be understood that various alterations in the details of construction and mode of assembly may be made without departing from the scope of the invention as indicated in the appended claims.

We claim:

1. A truck loader comprising, in combination, a vehicle frame provided with supporting wheels and axle rotatable as a unit, and having an elevated support thereon, a hoisting beam journaled on the support to move in a vertical plane and normally depending therefrom, a clutch mounted on the axle, hoisting means connecting the beam and movable part of the clutch, load grabbing and holding means associated with the free end of the beam, load actuated devices operable to engage the clutch to operate the hoisting means, instrumentalities connecting the hoisting means and last named devices operative to disengage the clutch at a given point in the hoisting operation, and a brake member inserted between the vehicle frame and clutch to bear against the movable part of the clutch when disengaged and retard its reverse movement due to the lowering of the hoisting means.

2. In a truck loader, the combination of a hoisting beam mounted to swing in a vertical plane, and actuating means therefor, bale engaging means disposed on the free end of the beam, a grab member pivotally supported on the beam in spaced relation to its free end and movable into engagement with the bale end remote from the said bale engaging means, releasable means disposed to support the grab member in an elevated position relative to its pivotal mounting, said releasable means having a part disposed to engage a bale when the grab member is moved thereover and operative to release the grab into engagement with the load, means actuated by swinging of the beam to return the grab member to its elevated position out of engagement with the load and reengage the releasable supporting means, a discharge member swingably mounted on the beam to bear against the load and means actuated by swinging of the beam operative to move the discharge member against the load to discharge the same.

3. In a truck loader, the combination of a hoisting beam mounted to swing in a vertical plane, and actuating means therefor, means disposed on the free end of the beam to engage one end of a bale, a grab member pivotally supported on the beam in spaced relation to its free end and movable into engagement with the other end of the bale, releasable means disposed to support the grab member in an elevated position relative to its pivotal mounting, said releasable means having a part disposed to engage a bale when the grab member is moved thereover and operative to release the grab into engagement with the load, and means actuated by swinging of the beam to return the grab member to its elevated position out of engagement with the load and reengage the releasable supporting means.

4. In a truck loader, in combination, a loading vehicle, an elevated support on the vehicle, a lifting beam journaled on the upper part of the support to swing in a vertical plane and depending therefrom, means operative to swing the beam forwardly and upwardly, bale engaging means disposed on the free end of the beam, a grab member pivotally supported on the beam in spaced relation to its free end and engageable with the other end of the bale, a gauge member mounted on the support adjacent the pivotal end of the lifting beam, an arm rotatably mounted on the beam and disposed to move into contact with the gauge member when the beam is elevated, and devices connecting the arm and grab member operative to pivotally actuate the grab member when the arm is rotated relative to the lifting beam by contact with the gauge member.

5. In a truck loader, in combination, a loading vehicle, an elevated support on the vehicle, a lifting beam journaled on the upper part of the support to swing in a vertical plane and depending therefrom, means operative to swing the beam forwardly and upwardly, bale engaging means disposed on the free end of the beam, supporting means fixedly mounted on the beam in spaced relation to its free end and extending forwardly therefrom, a grab member pivotally mounted on said supporting means for movement into and out of engagement with the other end of the bale, a lever associated with the supporting means and having one arm extending downwardly to slidably engage a bale and be actuated thereby, said lever having means associated therewith disposed to releasably engage and support the grab member in an elevated position relative to its pivotal mounting when the lever is in bale engaging position, and means actuated by the swinging of the beam operative to return the grab member to its supporting means.

6. In a truck loader, in combination, a loading vehicle, an elevated support on the vehicle, a lifting beam journaled on the upper part of the support to swing in a vertical plane, and depending therefrom, means operative to swing the beam forwardly and upwardly, bale engaging means disposed on the free end of the beam, a grab member pivotally supported on the beam in spaced relation to its free end and engageable with the other end of the bale, a gauge member mounted on the support adjacent the pivotal end of the lifting beam, a member rotatably mounted on the beam in parallel relation thereto, an arm fixedly mounted on one end of the member and disposed to move into contact with the gauge member when the beam is elevated, a link eccentrically connected to the other end of the member and to the grab member operative to pivotally actuate the grab member when the arm is rotated relative to the lifting beam by contact with the gauge member.

7. A truck loader comprising, in combination, a wheeled vehicle, an elevated support on the vehicle, a pulley journaled on the support to rotate in a vertical plane, a radially directed lifting beam mounted thereon, load grabbing and holding means associated with the free end of the beam, a clutch mounted on the running gear of the vehicle, a toggle inserted between the vehicle frame and the clutch to operate the same, a pulley mounted on the shiftable part of the clutch, a cable passing over the first named pulley and attached to the beam and second pulley, a push-rod connected to the toggle to actuate the same and projected forwardly of the beam when pendant whereby contact of the push-rod with a load will operate the toggle to engage the clutch and effect the elevation of the beam.

8. A truck loader comprising, in combination, a wheeled vehicle, an elevated support on the vehicle, a pulley journaled on the support to rotate in a vertical plane, a radially directed lifting beam mounted thereon, load grabbing and holding means associated with the free end of the beam, a clutch mounted on the running gear of the vehicle, a toggle inserted between the vehicle frame and the clutch to operate the same, a pulley mounted on the shiftable part of the clutch, a cable passing over the first named pulley and attached to the beam and second pulley, a push-rod connected to the toggle to actuate the same and projected forwardly of the beam when pendant whereby contact of the push-rod with a load will operate the toggle to engage the clutch and effect elevation of the beam, and a cable connecting the push-rod and first pulley to move the push-rod in the opposite direction and disengage the clutch when the beam is elevated a given distance.

9. A truck loader comprising, in combination, a wheeled vehicle, an elevated support on the vehicle, a pulley journaled on the support to rotate in a vertical plane, a radially directed lifting beam mounted thereon, load grabbing and holding means associated with the free end of the beam, a clutch mounted on the running gear of the vehicle, a toggle inserted between the vehicle frame and the clutch to operate the same, a pulley mounted on the shiftable part of the clutch, a cable passing over the first named pulley and attached to the beam and second pulley, a push-rod connected to the toggle to actuate the same and projected forwardly of the beam when pendant whereby contact of the push-rod with a load will operate the toggle to engage the clutch and effect elevation of the beam, a cable connecting the push-rod and first pulley to move the push-rod in the opposite direction and disengage the clutch when the beam is elevated a given distance, and a braking member associated with the clutch to engage the second pulley when the clutch is disengaged to retard rotation thereof.

10. In a truck loader, a loading vehicle having a frame, a vertically adjustable clamp mounted on the side thereof and adapted to engage a truck body, a tubular member fixedly mounted thereon in parallel relation to said frame and adjacent said clamp, a bar adjustably mounted in the forward end of said tubular member and projecting therefrom, and a truck body engageable clamp mounted on the forward end of the bar to align with the first clamp.

DARWIN D. McDERMOTT.
EDWARD J. RIMPLE.